United States Patent
Wu et al.

(10) Patent No.: US 12,213,009 B2
(45) Date of Patent: Jan. 28, 2025

(54) METHOD AND APPARATUS FOR CONTROLLING A CELL SELECTION PROCEDURE AND A HANDOVER PROCEDURE

(71) Applicant: LENOVO (BEIJING) LIMITED, Beijing (CN)

(72) Inventors: Lianhai Wu, Beijing (CN); Haiming Wang, Beijing (CN); Jing Han, Beijing (CN); Jie Shi, Beijing (CN); Jie Hu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 400 days.

(21) Appl. No.: 17/638,427

(22) PCT Filed: Aug. 27, 2019

(86) PCT No.: PCT/CN2019/102836
§ 371 (c)(1),
(2) Date: Feb. 25, 2022

(87) PCT Pub. No.: WO2021/035533
PCT Pub. Date: Mar. 4, 2021

(65) Prior Publication Data
US 2022/0303847 A1 Sep. 22, 2022

(51) Int. Cl.
*H04W 36/08* (2009.01)
*H04W 36/00* (2009.01)
*H04W 36/36* (2009.01)

(52) U.S. Cl.
CPC ...... *H04W 36/0011* (2013.01); *H04W 36/362* (2023.05); *H04W 36/083* (2023.05)

(58) Field of Classification Search
CPC ..... H04W 36/08; H04W 36/00; H04W 36/34; H04W 36/36; H04W 36/30; H04W 36/24;
(Continued)

(56) References Cited

U.S. PATENT DOCUMENTS 9,155,007 B2 * 10/2015 Jung ................. H04W 36/0066
9,456,370 B2 * 9/2016 Sharma ................. H04W 24/08
(Continued)

FOREIGN PATENT DOCUMENTS

CN 105228200 A 1/2016
CN 108811008 A 11/2018
(Continued)

OTHER PUBLICATIONS

International Searching Authority, "Written Opinion of the International Searching Authority," PCT/CN2019/102836, May 11, 2020, pp. 1-4.
(Continued)

*Primary Examiner* — Man U Phan
(74) *Attorney, Agent, or Firm* — Kunzler Bean & Adamson

(57) ABSTRACT

The present application is related to a method and apparatus for controlling a cell selection procedure and a handover procedure under 3GPP 5G New Radio (NR) technology. A method for wireless communication performed by a user equipment (UE) includes: starting a first timer for controlling a cell selection procedure; and performing the cell selection procedure to select a cell.

20 Claims, 6 Drawing Sheets

(58) Field of Classification Search
CPC ..... H04W 36/32; H04W 24/08; H04W 24/10;
H04W 36/26; H04W 74/08; H04W 76/18;
H04W 76/10; H04W 76/27; H04W 48/20;
H04W 68/00; H04W 76/19; H04W 76/36;
H04W 76/30; H04W 76/20
USPC .......................................................... 370/311
See application file for complete search history.

(56) References Cited

U.S. PATENT DOCUMENTS

| | | | | |
|---|---|---|---|---|
| 9,756,558 | B2* | 9/2017 | Sfar | H04W 48/16 |
| 10,194,402 | B2* | 1/2019 | Balachandran | H04B 17/3913 |
| 11,184,826 | B2* | 11/2021 | Lee | H04W 48/16 |
| 11,272,417 | B2* | 3/2022 | Chen | H04W 36/305 |
| 11,399,326 | B2* | 7/2022 | Latheef | H04W 36/08 |
| 11,582,655 | B2* | 2/2023 | Kimba Dit Adamou | H04W 36/0079 |
| 11,778,530 | B2* | 10/2023 | Lee | H04W 36/362 370/331 |
| 11,895,545 | B2* | 2/2024 | Da Silva | H04W 36/0058 |
| 11,895,550 | B2* | 2/2024 | Latheef | H04W 76/27 |
| 11,902,843 | B2* | 2/2024 | Da Silva | H04W 36/305 |
| 2015/0195753 | A1 | 7/2015 | Jung et al. | |
| 2019/0223073 | A1 | 7/2019 | Chen et al. | |
| 2021/0058836 | A1 | 2/2021 | Kimba Dit Adamou | |
| 2022/0159530 | A1* | 5/2022 | Kim | H04W 36/362 |
| 2022/0031228 | A1 | 9/2022 | Chang et al. | |

FOREIGN PATENT DOCUMENTS

| | | |
|---|---|---|
| CN | 108934049 A | 12/2018 |
| CN | 110149663 A | 8/2019 |
| CN | 112087785 A | 12/2020 |
| WO | 2018230997 A1 | 12/2018 |
| WO | 2019134163 A1 | 7/2019 |

OTHER PUBLICATIONS

Intel Corporation, Failure handling on CHO, 3GPP TSG RAN WG2 Meeting #106, R2-1906286, May 13 to 17, 2019, pp. 1-3, Reno, USA.

ZTE Corporation, Sanechips, Discussion on fast HO failure recovery, 3GPP TSG RAN WG2 Meeting #106, R2-1907094, May 13-17, 2019, pp. 1-4, Reno, USA.

China Telecom, [Offline Discussion-081] summary of NR agreements that could be 'imported' to LTE, 3GPP TSG-RAN WG2 Meeting #106, R2-1908431, May 13-17, 2019, pp. 1-8, Reno, USA.

Nokia, Nokia Shanghai Bell, On the actions upon RLF or HOF when CHO was configured, 3GPP TSG-RAN WG2 Meeting #107, R2-1909289, Aug. 26-30, 2019, pp. 1-3, Prague, Czechia.

Vivo, "Report on [106#41][NR and LTE CHO]—CHO execution details", 3GPP TSG-RAN WG2 Meeting #107 R2-1909536, Aug. 26-30, 2019, pp. 1-55.

Catt, "Radio link failure in NR", TSG-RAN WG2 Meeting #97bis R2-1703100, Apr. 3-7, 2017, pp. 1-2.

* cited by examiner

METHOD AND APPARATUS FOR CONTROLLING A CELL SELECTION PROCEDURE AND A HANDOVER PROCEDURE

TECHNICAL FIELD

Embodiments of the present application generally relate to wireless communication technology, in particular to solutions for cell selection procedure and handover procedure.

BACKGROUND

A base station (BS) can have some cells (or areas) to provide communication service. In 3rd Generation Partnership Project (3GPP) Release 17, when a user equipment (UE) needs to handover from a serving cell of a source base station (BS) to a candidate cell of a candidate BS, details of a handover procedure (e.g. a failure handling mechanism, a conditional handover (CHO) procedure, etc.), and a cell selection procedure before the handover procedure have not been discussed in 5G New Radio (NR) technology.

SUMMARY

Some embodiments of the present application provide a method for wireless communication performed by a user equipment (UE). The method includes: starting a first timer for controlling a cell selection procedure; and performing the cell selection procedure to select a cell.

Some embodiments of the present application provide an apparatus for wireless communications. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement the abovementioned method performed by a UE.

Some embodiments of the present application provide a method for wireless communication performed by a source base station (BS). The method includes: determining whether a conditional handover (CHO) procedure of a UE to a target cell is completed; and in response to completion of the CHO procedure, transmitting a handover cancel message to a candidate BS which the UE does not access, wherein the handover cancel message includes an information element to indicate a cause as to why a handover procedure to the candidate BS is cancelled.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the abovementioned method performed by a BS.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

Figure 1:
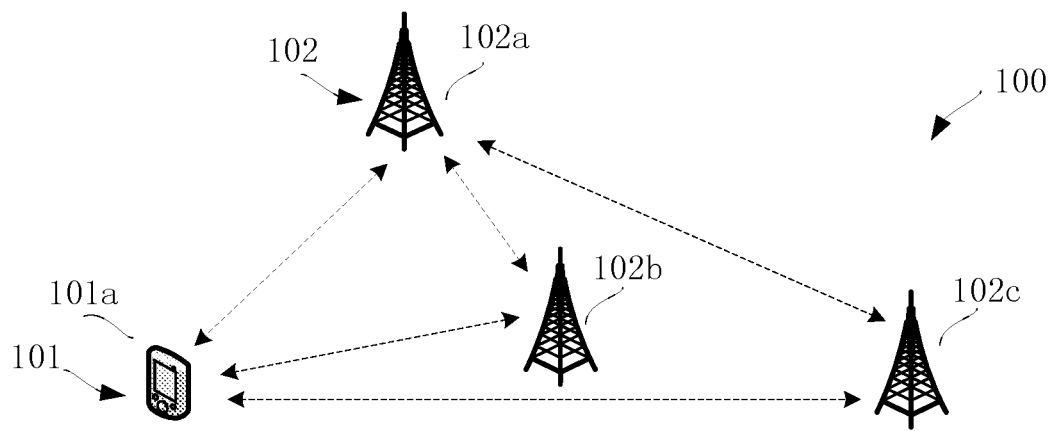
FIG. 1 illustrates a schematic diagram of a wireless communication system in accordance with some embodiments of the present application.

FIG. 1 illustrates a schematic diagram of a wireless communication system in accordance with some embodiments of the present application.

As illustrated and shown in FIG. 1, a wireless communication system 100 includes at least one user equipment (UE) 101 and at least one base station (BS) 102. In particular, the wireless communication system 100 includes one UE 101 (e.g., UE 101a) and three BSs 102 (e.g., BS 102a, BS 102b, and BS 102c) for illustrative purpose. Although a specific number of UEs 101 and BSs 102 are depicted in FIG. 1, it is contemplated that any number of UEs 101 and BSs 102 may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), internet of things (IoT) devices, or the like. According to some embodiments of the present application, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present application, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate directly with BSs 102 via uplink (UL) communication signals.

In some embodiments of the present application, each of the UE(s) 101 may be deployed an IoT application, a eMBB application and/or an URLLC application. It is contemplated that the specific type of application(s) deployed in the UE(s) 101 may be varied and not limited.

The BS(s) 102 may be distributed over a geographic region. In certain embodiments of the present application, each of the BS(s) 102 may also be referred to as an access point, an access terminal, a base, a base unit, a macro cell, a Node-B, an evolved Node B (eNB), a gNB, a NG-RAN (Next Generation-Radio Access Network) node, a Home Node-B, a relay node, or a device, or described using other terminology used in the art. The BS(s) 102 is generally a part of a radio access network that may include one or more controllers communicably coupled to one or more corresponding BS(s) 102. BS(s) 102 may communicate directly with each other. For example, BS(s) 102 may communicate directly with each other via Xn interface or X2 interface.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3GPP-based network, a 3GPP 5G network, a satellite communications network, a high altitude platform network, and/or other communications networks.

In some embodiments of the present application, the wireless communication system 100 is compatible with the 5G NR of the 3GPP protocol, wherein BS(s) 102 transmit data using an OFDM modulation scheme on the DL and the UE(s) 101 transmit data on the UL using a single-carrier frequency division multiple access (SC-FDMA) or OFDM scheme. More generally, however, the wireless communication system 100 may implement some other open or proprietary communication protocols, for example, WiMAX, among other protocols.

In some embodiments of the present application, the BS(s) 102 may communicate using other communication protocols, such as the IEEE 802.11 family of wireless communication protocols. Further, in some embodiments of the present application, the BS(s) 102 may communicate over licensed spectrums, whereas in other embodiments, the BS(s) 102 may communicate over unlicensed spectrums. The present application is not intended to be limited to the implementation of any particular wireless communication system architecture or protocol. In yet some embodiments of the present application, the BS(s) 102 may communicate with the UE(s) 101 using the 3GPP 5G protocols.

Each BS(s) 102 may include one or more cells. Each UE(s) 101 may perform a cell section procedure between different cell(s) of different BS(s). Each UE(s) 101 may handover from a serving cell of a source BS to a candidate cell of a candidate BS. For example, in the wireless communication system 100 as illustrated and shown in FIG. 1, BS 102a may function as a source BS, and each of BS 102b and BS 102c may function as a candidate BS. If there is a handover need, UE 101a as illustrated and shown in FIG. 1 may perform a handover procedure from a serving cell of BS 102a to a candidate cell of BS 102b or a candidate cell of BS 102c, which depends a result of a cell selection procedure. The handover procedure performed by UE 101a may be a CHO procedure.

In 3GPP 5G NR technology, when a Radio Link Failure (RLF) occurs, a UE needs to perform a cell selection procedure to select a cell. Besides, at a legacy handover failure (expiry of a Timer T304) or a failure to access a CHO candidate cell (expiry of a CHO failure Timer), a UE also needs to perform a cell selection procedure.

Currently, in some solutions under 5G NR, if the selected cell during a cell selection procedure performed by a UE is associated with conditional handover configuration (such cell may be named as a CHO candidate cell), the UE attempts to execute a CHO procedure. Otherwise, if the selected cell during a cell selection procedure is not associated with conditional handover configuration (such cell may be named as a non-CHO candidate cell), the UE performs a Radio Resource Control (RRC) re-establishment procedure.

As defined in 3GPP TS38.331, the Timer T304 is started upon reception of RRC Reconfiguration message including reconfigurationWithSync, and is stopped upon successful completion of random access on the corresponding SpCell (special Cell). When the Timer T304 expires, the handover failure happens. Once the Timer T304 expires, a UE may perform a cell selection procedure according to some embodiments of the present application.

Additionally, a Timer T311 is used to control a cell selection procedure included in the re-establishment procedure. As defined in 3GPP TS38.331, the Timer T311 is started upon initiating RRC connection re-establishment procedure, and is stopped upon selection of a suitable NR cell or a cell using another Radio Access Technology (RAT). When the Timer T304 expires, a UE enters into an idle state, e.g., RRC_IDLE state, which is specified as "Enter RRC_IDLE" in 3GPP TS38.331.

As defined in 3GPP TS38.304, the RRC_IDLE state tasks of UE can be subdivided into three processes:
(1) PLMN selection;
(2) Cell selection and reselection;
(3) Location registration and RNA update.

PLMN selection, cell reselection procedures, and location registration are common for both RRC_IDLE state and RRC_INACTIVE state. When UE selects a new PLMN, UE transitions from RRC_INACTIVE to RRC_IDLE, as specified in 3GPP TS24.501 [14].

When a UE is switched on, a public land mobile network (PLMN) is selected by NAS. For the selected PLMN, associated RAT(s) may be set, as specified in 3GPP TS23.122 [9]. The NAS shall provide a list of equivalent PLMNs, if available, that the AS shall use for cell selection and cell reselection.

With cell selection, the UE searches for a suitable cell of the selected PLMN, chooses that cell to provide available services, and monitors its control channel. This procedure is defined as "camping on the cell".

The UE shall, if necessary, register its presence, by means of a NAS registration procedure, in the tracking area of the chosen cell. As an outcome of a successful Location Registration, the selected PLMN then becomes the registered PLMN, as specified in 3GPP TS23.122 [9].

If the UE finds a more suitable cell, according to the cell reselection criteria, it reselects onto that cell and camps on it. If the new cell does not belong to at least one tracking area to which the UE is registered, location registration is performed. In RRC_INACTIVE state, if the new cell does not belong to the configured RNA, an RNA update procedure is performed.

In short, the abovementioned solutions confirm that a cell selection procedure is performed right after an occurrence of RLF while before RRC re-establishment initialization. However, since a cell selection procedure needs to be performed before initiating the RRC re-establishment procedure, the legacy Timer T311 cannot be used to control the cell selection procedure. Accordingly, problems of how to handle a failure before or during a cell selection procedure and how to control a cell selection procedure need to be solved.

Embodiments of the present application aim to provide solutions for controlling a cell selection procedure performed by a UE supporting NR to solve the above problems. Specifically, embodiments of the present application design a new timer to control a cell selection procedure, and introduce new event(s) for starting the new timer for controlling the cell selection procedure. Some embodiments of the present application reuse the event of "Upon selection of a suitable NR cell or a cell using another RAT" to stop the new timer. Some embodiments of the present application reuse UE's behavior of "Enter RRC_IDLE" upon expiry of the new timer. More details on embodiments of the present application will be illustrated in the following text in combination with the appended drawings.

Figure 2:
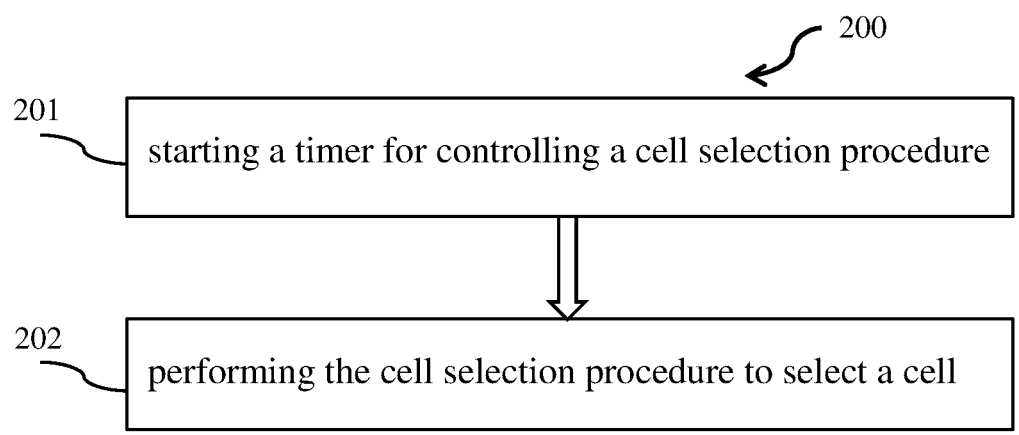
FIG. 2 illustrates a flow chart of a method for wireless communication in accordance with some embodiments of the present application.

FIG. 2 illustrates a flow chart of a method for wireless communication in accordance with some embodiments of the present application.

In the exemplary method 200 as illustrated and shown in FIG. 2, in operation 201, a UE (e.g., UE 101a as illustrated and shown in FIG. 1) starts a timer for controlling a cell selection procedure. The timer may be configured by a source BS (e.g., BS 102a as illustrated and shown in FIG. 1) by RRC signalling. In operation 202, the UE performs the cell selection procedure to select a cell.

In some embodiments of the present application, if the timer which is started in operation 201 expires, the UE enters into an idle state. The idle state may be RRC_IDLE state that is specified in 3GPP TS38.331. In some embodiments of the present application, if a suitable cell or a cell using another Radio Access Technology (RAT) is selected by the UE during the cell selection procedure, the UE stops the timer.

"A suitable cell" is a cell on which a UE may camp. For NR cell, the criteria of "a suitable cell" are defined in clause 4.5; and for E-UTRA (Evolved Universal Terrestrial Radio Access) cell, the criteria of "a suitable cell" are defined in 3GPP TS36.304.

In some embodiments of the present application, the UE starts the timer for controlling cell selection based on at least one of the following Cases 1-7.

Case 1: detecting a RLF; or expiry of a RLF timer (e.g., a Timer T310).

As defined in 3GPP TS38.331, the Timer T310 is started upon detecting physical layer problems for the SpCell, i.e., upon receiving N310 consecutive out-of-sync indications from lower layers. The Timer T310 is stopped upon receiving N311 consecutive in-sync indications from lower layers for the SpCell, upon receiving RRC Reconfiguration with reconfigurationWithSync for that cell group, and upon initiating the connection re-establishment procedure.

Case 2: detecting a re-configuration with sync failure.

Case 3: detecting mobility from NR failure (e.g., a normal handover failure); or expiry of a handover failure timer. For example, a Timer T304 expiry means that a handover failure occurs.

Case 4: detecting an indication of an integrity check failure from lower layers concerning Signaling Radio Bearer (SRB) 1 or SRB2, except the integrity check failure being detected on a RRC Re-establishment message.

Case 5: detecting a RRC connection reconfiguration failure.

Case 6: a CHO failure; or expiry of a CHO failure timer. If the Timer T304 is reused as the CHO failure timer, Case 6 is the same as Case 1.

Case 7: initiating the cell selection procedure. Case 7 is a common event for starting the timer for controlling cell selection, which may be used to anyone of Cases 1-6.

The following table lists exemplary operations of the timer for controlling cell selection corresponding to Cases 1-7 in accordance with some embodiments of the present application.

| | Timer for controlling cell selection | | |
|---|---|---|---|
| | Time to Start | Time to Stop | Expiry |
| Case 1 | Upon detecting radio link failure, or T310 expiry | Upon selection of a suitable NR cell or a cell using another RAT | Enter RRC_IDLE |
| Case 2 | Upon re-configuration with sync failure | Upon selection of a suitable NR cell or a cell using another RAT | Enter RRC_IDLE |
| Case 3 | T304 expiry | Upon selection of a suitable NR cell or a cell using another RAT | Enter RRC_IDLE |
| Case 4 | Upon integrity check failure indication from lower layers concerning SRB1 or SRB2, except if the integrity check failure is detected on the RRC Re-establishment message | Upon selection of a suitable NR cell or a cell using another RAT | Enter RRC_IDLE |
| Case 5 | Upon an RRC connection reconfiguration failure | Upon selection of a suitable NR cell or a cell using another RAT | Enter RRC_IDLE |
| Case 6 | expiry of a CHO failure timer | Upon selection of a suitable NR cell or a cell using another RAT | Enter RRC_IDLE |
| Case 7 | Initiating the cell selection | Upon selection of a suitable NR cell or a cell using another RAT | Enter RRC_IDLE |

In some embodiments of the present application, the UE further determines whether the selected cell is associated with conditional handover configuration or not. If the selected cell is associated with the conditional handover configuration, i.e., the selected cell is a CHO candidate cell, the UE may perform a CHO procedure and access the selected cell. If the selected cell is not associated with the conditional handover configuration, i.e., the selected cell is a non-CHO candidate cell, the UE may perform a re-establishment procedure and access the selected cell.

In the case that there are one or more CHO candidate cells for the UE to select during a cell selection procedure, all CHO candidate cells are configured to the UE for a CHO procedure. In other words, all CHO candidate cells reserve resource(s) and include CHO configuration information for the UE. The UE selects a CHO candidate cell from all the CHO candidate cells by a cell selection procedure. Among all the CHO candidate cells, the selected CHO candidate cell which a UE successfully accesses may be named as a target cell. A CHO candidate BS belonging to the target cell may be named as a target BS. In response to successful access to the target cell, the UE may transmit a RRC reconfiguration complete message to the target BS.

Upon a RRC reconfiguration complete message transmission, the UE may release CHO configuration information associated with all CHO candidate cells. Alternatively, the UE may start another timer upon the RRC reconfiguration complete message transmission. In response to expiry of the abovementioned another timer, the UE may release CHO configuration information associated with all CHO candidate cells.

The abovementioned another timer may be configured by the source BS and transmitted from the source BS to the UE. For example, this timer is configured by the source BS and included in a CHO command, and the CHO command is transmitted from the source BS to the UE.

The abovementioned another timer may be configured by the target cell and transmitted from the source BS to the UE. For one example, configuration information of the abovementioned another timer is included in a container, and the container is transmitted from the target BS to the source BS and is then transmitted from the source BS to the UE. The container may be transmitted by Xn interface or X2 interface between the target BS and the source BS. For another example, configuration information of the abovementioned another timer is included in a handover acknowledge message, and the handover acknowledge message is transmitted from the target BS to the source BS and is then transmitted from the source BS to the UE.

Figure 3:
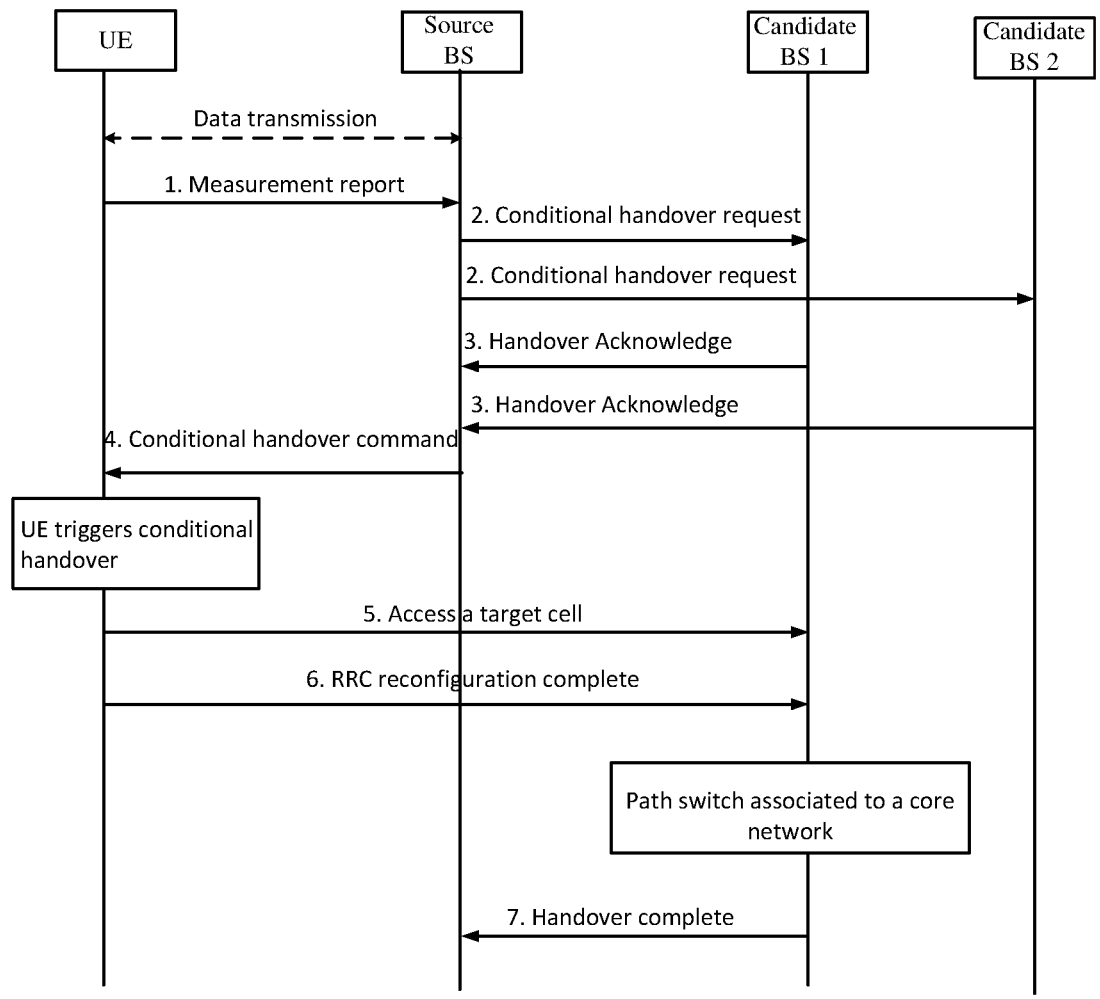
FIG. 3 illustrates an exemplary CHO procedure in accordance with some embodiments of the present application.

FIG. 3 illustrates an exemplary CHO procedure in accordance with some embodiments of the present application. In the embodiments of FIG. 3, each of Source BS (e.g., BS 102a as illustrated and shown in FIG. 1), Candidate BS 1 (e.g., BS 102b or BS 102c as illustrated and shown in FIG. 1) and Candidate BS 2 (e.g., BS 102c or BS 102b as illustrated and shown in FIG. 1) may be gNB or LTE eNB.

As shown in FIG. 3, optional step(s) of the conditional handover procedure are marked as dashed, for example, data transmission between a UE (e.g., UE 101a as illustrated and shown in FIG. 1) and Source BS belonging to a serving cell.

In Step 1 of FIG. 3, the UE reports measurement results to Source BS. For instance, the UE may report Reference Signal Received Power (RSRP) and Reference Signal Received Quality (RSRQ) to Source BS.

In Step 2 of FIG. 3, Source BS belonging to the serving cell transmits a conditional handover request to candidate cell(s) in each of Candidate BS 1 and Candidate BS 2. If Source BS belonging to the serving cell makes a decision to perform a CHO procedure based on the measurement result(s) received from the UE, Source BS belonging to the serving cell may send a conditional handover request to candidate cell(s). The conditional handover request may be sent to more than one candidate cells of more than one candidate BSs.

In Step 3 of FIG. 3, Source BS receives a handover acknowledge message from the candidate cell(s). There may be more than one candidate cells, and each candidate cell transmits a handover acknowledge message towards Source BS. For instance, as shown in FIG. 3, since both Candidate BS 1 and Candidate BS 2 have candidate cell(s) for the UE, each of Candidate BS 1 and Candidate BS 2 sends a handover acknowledge message to Source BS belonging to the serving cell.

In Step 4 of FIG. 3, Source BS sends a conditional handover command to the UE. The conditional handover command may be transmitted in RRC reconfiguration message. The conditional handover command may include one or more candidate conditional handover configurations and handover execution conditions. For instance, as shown in FIG. 3, since both Candidate BS 1 and Candidate BS 2 send handover acknowledge messages, candidate conditional handover configurations and handover execution conditions for both Candidate BS 1 and Candidate BS 2 are transmitted from Source BS to the UE.

After the Step 4 of FIG. 3, the UE may evaluate the one or more candidate conditional handover configurations and handover execution conditions for all candidate BSs, and then trigger a CHO procedure to a target BS. The target BS is selected from all candidate BSs and includes a suitable target cell for a CHO procedure of the UE.

In Step 5 of FIG. 3, assuming that Candidate BS 1 has a suitable target cell for a CHO procedure of the UE, the UE accesses Candidate BS 1 (i.e., a target BS) when condition(s) is met. In addition, the UE may apply RRC reconfiguration and access the suitable target cell of Candidate BS 1 when the condition(s) is met.

In Step 6 of FIG. 3, the UE transmits RRC reconfiguration complete message to Candidate BS 1 (i.e., the target BS). After receiving the RRC reconfiguration complete message, Candidate BS 1 may perform path switch associated to a core network.

In Step 7 of FIG. 3, Candidate BS 1 sends a handover complete message to Source BS belonging to the serving cell, in order to inform that the CHO procedure has been completed successfully.

Usually, after a candidate BS (e.g., BS 102b or BS 102c as illustrated and shown in FIG. 1) acknowledges a conditional handover request for a UE (e.g., UE 101a as illustrated and shown in FIG. 1), the candidate BS reserve resource(s) (e.g., Random Access Channel (RACH) resource) for this UE access. If this candidate BS is not selected as a real target BS for connection, the reserved resource(s) needs to be released. When to release the reserved resource(s) is not specified in current 3GPP standard documents.

However, for a higher reliability purpose, more than one candidate cells of one or more candidate BSs are prepared for a CHO procedure. In addition, the resource(s) for a CHO procedure should be served longer than a normal handover procedure, because CHO configuration is transmitted earlier than the normal handover procedure. Therefore, it is helpful to inform the candidate cell the time of releasing the reserved resource(s). In some embodiments of the present application, "a handover cancel message" is reused during a CHO procedure, so as to inform a candidate BS to release the reserved resource(s). A specific example is shown in FIG. 4.

Figure 4:
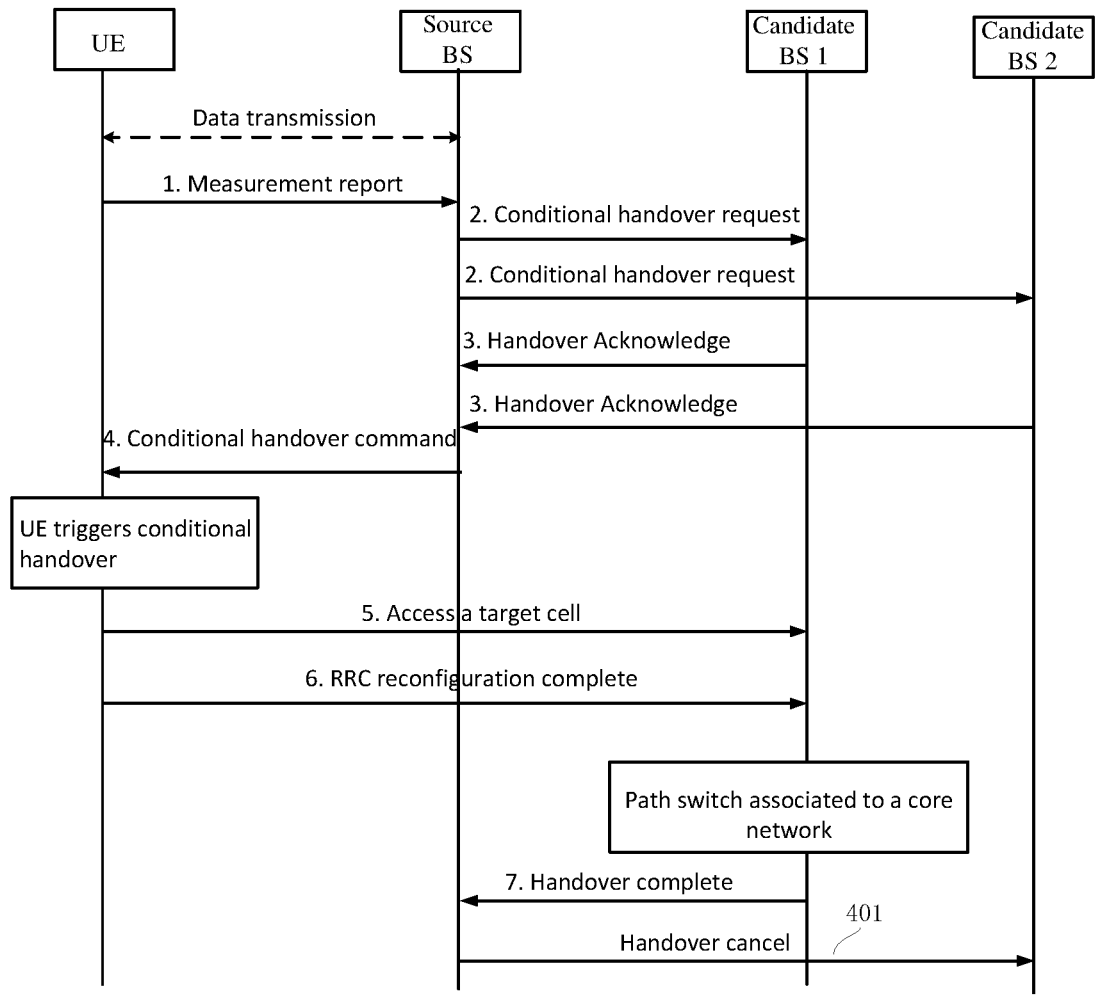
FIG. 4 illustrates an exemplary CHO procedure in accordance with some embodiments of the present application.

FIG. 4 illustrates an exemplary CHO procedure in accordance with some embodiments of the present application. In the embodiments of FIG. 4, all steps and operations are the same as those in FIG. 3 except operation 401.

Specifically, after Source BS belonging to the serving cell receives a handover complete message from Candidate BS 1 as shown in Step 7 of FIG. 4, in operation 401 of FIG. 4, Source BS further sends a handover cancel message to a candidate BS (i.e., Candidate BS 2 as illustrated and shown in FIG. 4) which has acknowledged the handover request and reserved resource(s) for the UE (e.g., UE 101a as illustrated and shown in FIG. 1) but is not selected by the UE as a real target BS for connection. A handover cancel message in operation 401 of FIG. 4 may also be named as HANDOVER CANCEL message, Handover Cancel message, Handover cancel message, or the like.

As defined in 3GPP TS38.423, "a handover cancel message" is sent by a source NG-RAN node to a target NG-RAN node to cancel an ongoing handover. Moreover, a handover cancel message includes five information elements (IE), including: Message Type, Source NG-RAN node UE XnAP (Xn application protocol) ID (identifier), Target NG-RAN node UE XnAP ID, and Cause. The fifth IE in a handover cancel message, i.e., "Cause," indicates reason(s) for cancelling the handover by means of an appropriate cause value.

In some embodiments of FIG. 4, the "Cause" in a handover cancel message is defined as a new cause. For example, a Handover cancel message includes at least one of "CHO completion" and "procedure cancellation".

As defined in 3GPP TS38.423, a cause of "procedure cancelled" for a handover cancel message includes: (1) the sending node cancelled the procedure due to other urgent actions to be performed; and (2) in the current version of this specification applicable for Dual Connectivity only.

In some other embodiments of FIG. 4, the "Cause" in a handover cancel message reuses the cause of "procedure cancelled". For example, the "Cause" in a handover cancel message may be the cause of "procedure cancelled" which represents: if a UE in the CHO procedure is not associated with Dual Connectivity (DC), the UE has completed the CHO procedure and the candidate BS can cancel CHO configuration information associated with the UE. A candidate BS cancelling CHO configuration information may include releasing the reserved resource(s) for the UE.

Figure 5:
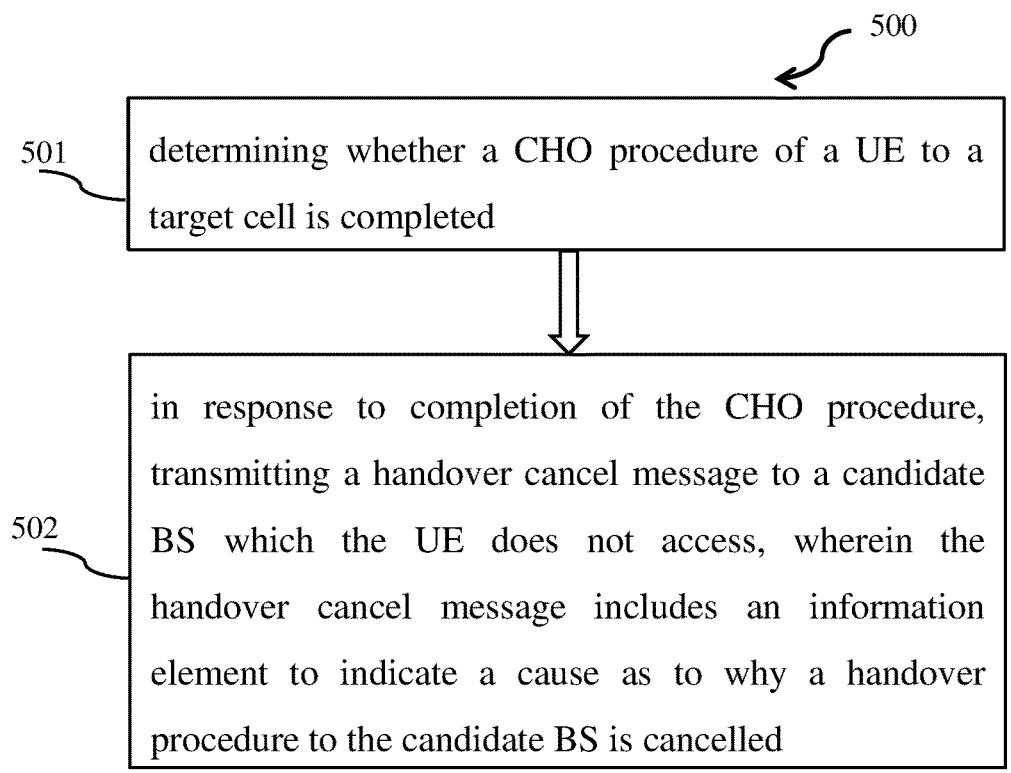
FIG. 5 illustrates another flow chart of a method for wireless communication in accordance with some embodiments of the present application.

FIG. 5 illustrates another flow chart of a method for wireless communication in accordance with some embodiments of the present application.

In the exemplary method 500 as illustrated and shown in FIG. 5, in operation 501, a source BS (e.g., BS 102a as illustrated and shown in FIG. 1 or Source BS as illustrated and shown in FIGS. 3, 4, 6, and 7) determines whether a CHO procedure of a UE (e.g., UE 101a as illustrated and shown in FIG. 1 or UE as illustrated and shown in FIGS. 3, 4, 6, and 7) to a target cell is completed. In operation 502, in response to completion of the CHO procedure, the source BS transmits a handover cancel message to a candidate BS which the UE does not access, wherein the handover cancel message includes an information element to indicate a cause as to why a handover procedure to the candidate BS is cancelled.

Before the operation 501 in the exemplary method 500, the candidate BS may transmit a handover acknowledge message to the source BS, to acknowledge a handover procedure for the UE. In response to receipt of the handover cancel message, the candidate BS may cancel CHO configuration information for the UE. For example, the candidate BS releases the reserved resource(s) for the UE.

In the operation 501 in the exemplary method 500, the source BS receives a handover complete message from a target BS; and in response to receipt of the handover complete message, the source BS determines that the UE successfully accesses the target cell. Based on the successful access to the target cell, the source BS determines that the CHO procedure of the UE to the target cell is completed.

Details described in all the foregoing embodiments of the present application are applicable for the embodiments of FIG. 5, especially, the cause in a handover cancel message as illustrated and described in the embodiments of FIG. 4.

Figure 6:
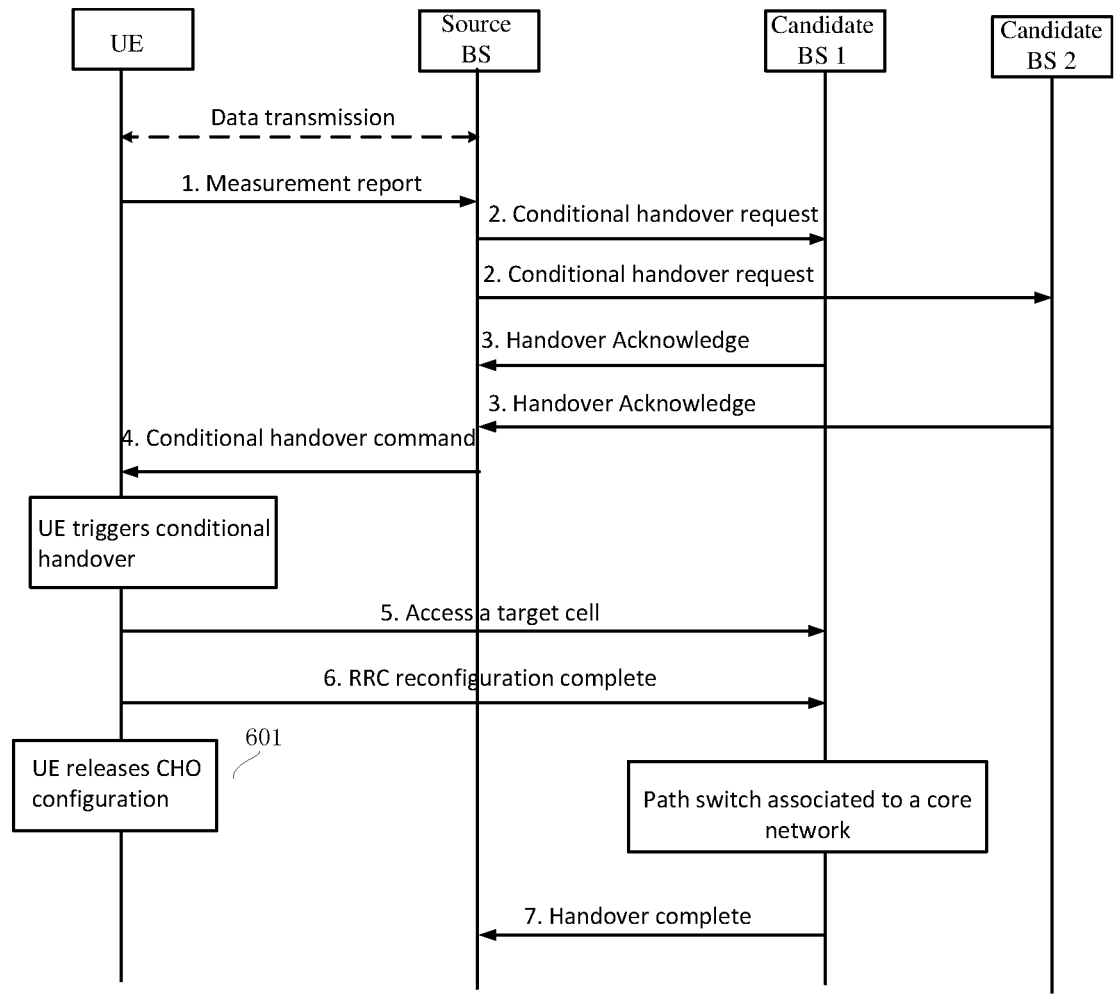
FIG. 6 illustrates a further exemplary CHO procedure in accordance with some embodiments of the present application.

FIG. 6 illustrates a further exemplary CHO procedure in accordance with some embodiments of the present application. Similar to the embodiments of FIG. 4, in the embodiments of FIG. 6, all steps and operations are the same as those in FIG. 3 except operation 601.

Specifically, after the UE transmits RRC reconfiguration complete message to Candidate BS 1 as show in Step 6 of FIG. 6, the UE (e.g., UE 101a as illustrated and shown in FIG. 1) releases CHO configuration information in operation 601 of FIG. 6. Alternatively, in the embodiments of FIG. 6, upon RRC reconfiguration complete message transmission to Candidate BS 1 as show in Step 6 of FIG. 6, the UE releases CHO configuration information in operation 601 of FIG. 6.

The UE may release CHO configuration information associated with all CHO candidate cell(s) in accordance with some embodiments of the present application. For example, the UE releases CHO configuration information associated with all candidate cell(s) of Candidate BS 2, as illustrated and shown in FIGS. 3, 4, 6, and 7.

In certain scenarios, an RLF occurs shortly after a successful handover from a source cell to a target cell or a handover failure occurs during the handover procedure; then, a UE will attempt to re-establish the radio link connection in a cell other than the source cell and the target cell. In other words, under such scenarios, an RLF occurs shortly after a successful handover procedure and a UE handovers to a wrong cell. Thus, it is helpful for the UE to keep CHO configuration(s) for CHO candidate cell(s) for a short time, to further handover to a right cell according to the kept CHO configuration(s). Timer-based CHO configuration release is designed in some embodiments of the present application. A specific example is shown in FIG. 7.

Figure 7:
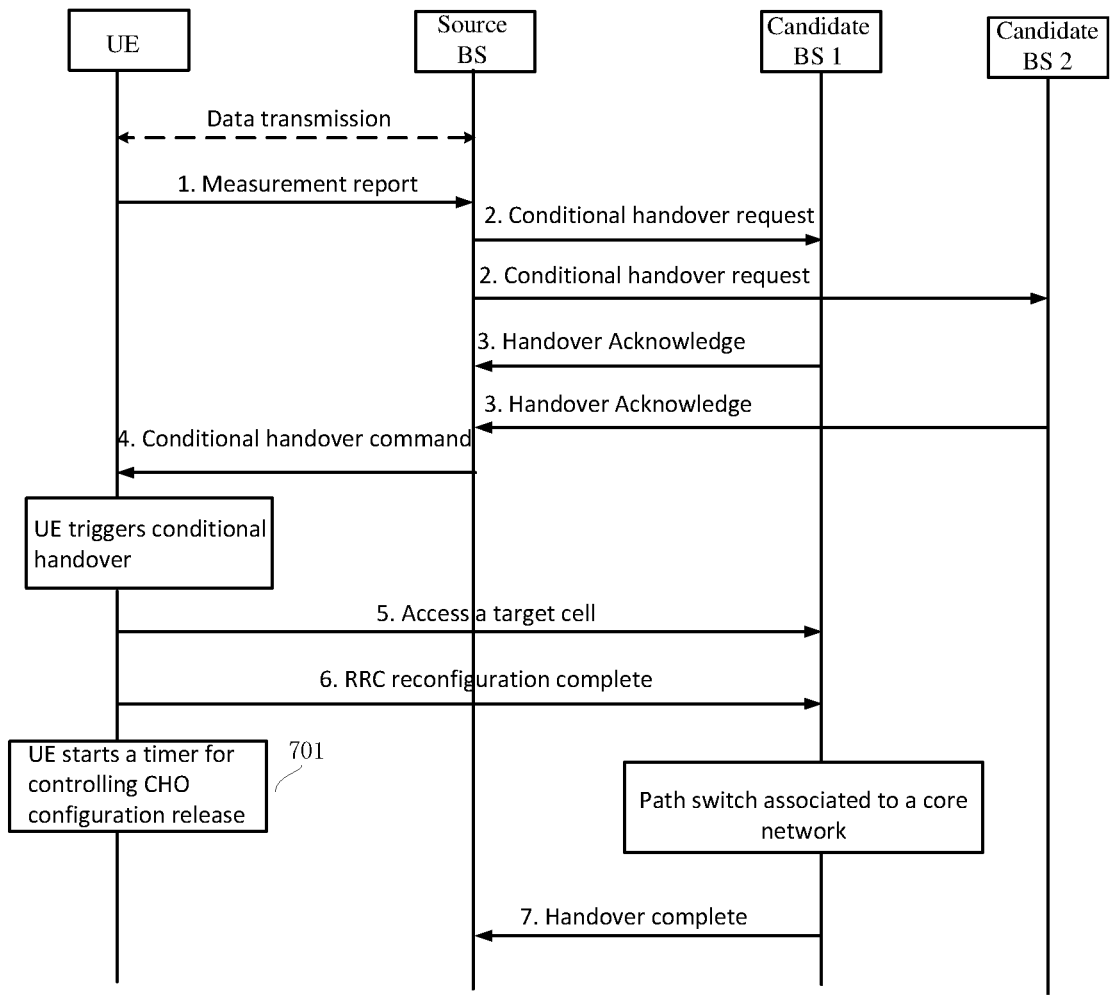
FIG. 7 illustrates an additional exemplary CHO procedure in accordance with some embodiments of the present application.

FIG. 7 illustrates an additional exemplary CHO procedure in accordance with some embodiments of the present application. Similar to the embodiments of FIGS. 4 and 6, in the embodiments of FIG. 7, all steps and operations are the same as those in FIG. 3 except operation 701.

Specifically, upon the RRC reconfiguration complete message transmission to Candidate BS 1 as show in Step 6 of FIG. 7, the UE (e.g., UE 101a as illustrated and shown in FIG. 1) starts a timer for CHO configuration release in operation 701 of FIG. 7. Then, upon expiry of the timer for CHO configuration release, the UE releases CHO configuration information. As described above, the UE may release CHO configuration information associated with all CHO candidate cell(s) in accordance with some embodiments of the present application.

According to some embodiments of FIG. 7, the timer started by the UE in operation 701 of FIG. 7 is configured by Source BS (e.g., BS 102a as illustrated and shown in FIG. 1), and configuration information of the timer (e.g., a value of the timer) is transmitted from Source BS to the UE.

According to some other embodiments of FIG. 7, the timer started by the UE in operation 701 of FIG. 7 is configured by a target BS in the CHO procedure, and configuration information of the timer (e.g., a value of the timer) is transmitted from the source BS to the UE. For one example, the configuration information of the timer is included in a container, and the container is transmitted from the target BS to the source BS and is then transmitted from the source BS to the UE. The container may be transmitted by Xn interface or X2 interface. For another example, the configuration information of the timer is included in a handover acknowledge message, and the handover acknowledge message is transmitted from the target BS to the source BS and is then transmitted from the source BS to the UE.

Details described in all the foregoing embodiments of the present application (for example, how to handle a failure before or during a cell selection procedure and how to control a cell selection procedure) are applicable for the embodiments as illustrated and shown in FIGS. 2 and 5.

Figure 8:
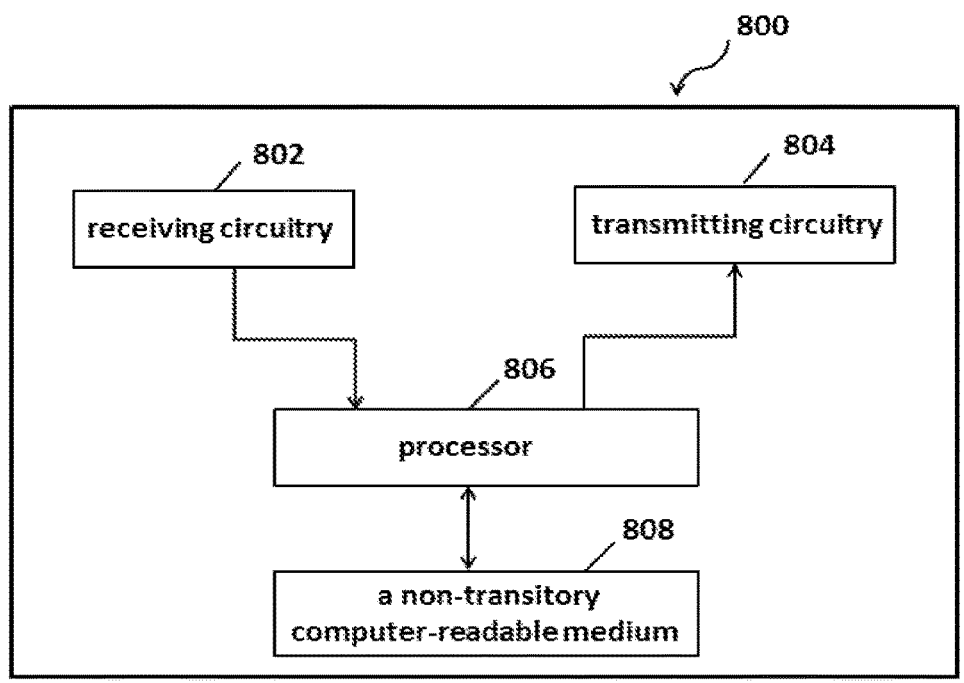
FIG. 8 illustrates a block diagram of an exemplary apparatus in accordance with some embodiments of the present application.

FIG. 8 illustrates a block diagram of an exemplary apparatus in accordance with some embodiments of the present application. Referring to FIG. 8, the apparatus 800 includes a receiving circuitry 802, a transmitting circuitry 804, a processor 806, and a non-transitory computer-readable medium 808. The processor 806 is coupled to the non-transitory computer-readable medium 808, the receiving circuitry 802, and the transmitting circuitry 804.

It is contemplated that some components are omitted in FIG. 8 for simplicity. In some embodiments, the receiving circuitry 802 and the transmitting circuitry 804 may be integrated into a single component (e.g., a transceiver).

In some embodiments, the non-transitory computer-readable medium 808 may have stored thereon computer-executable instructions to cause a processor to implement the operations with respect to UE(s) as described above. For example, upon execution of the computer-executable instructions stored in the non-transitory computer-readable medium 808, the processor 806 performs the method of FIG. 2, including starting a timer for controlling a cell selection procedure and performing the cell selection procedure to select a cell.

In some embodiments, the non-transitory computer-readable medium 1208 may have stored thereon computer-executable instructions to cause a processor to implement the operations with respect to BS(s) as described above. For example, upon execution of the computer-executable instructions stored in the non-transitory computer-readable medium 808, the processor 806 and the transmitting circuitry 804 perform the method of FIG. 5, including the processor 806 determining whether a CHO procedure of a UE to a target cell is completed, and the processor 806 controlling the transmitting circuitry 804 to transmit, to a CHO candidate BS which the UE does not access, a handover cancel message in response to completion of the CHO procedure, wherein the handover cancel message includes an information element to indicate a cause as to why a handover procedure to the CHO candidate BS is cancelled.

The method of the present application can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of the present application.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A method for wireless communication performed by a user equipment (UE), the method comprising:
   initiating a re-establishment procedure and starting a first timer for controlling a cell selection procedure, based on at least one of the following conditions:
      detecting a re-configuration with sync failure;
      detecting mobility from new radio (NR) failure;
      expiry of a handover failure timer;
      detecting an indication of an integrity check failure from lower layers concerning signaling radio bearer (SRB) 1 or SRB2, except the integrity check failure being detected on a radio resource control (RRC) re-establishment message;
      detecting a RRC connection reconfiguration failure;
      expiry of a conditional handover failure timer; and
      initiating the cell selection procedure; and
   performing the cell selection procedure to select a cell.

2. The method of claim 1, wherein the first timer is started further based on at least one of the following conditions:
   detecting a radio link failure; and
   expiry of a radio link failure timer.

3. The method of claim 1, wherein the first timer is configured by a source base station (BS) by RRC signalling.

4. The method of claim 1, further comprising entering an idle state in response to expiry of the first timer.

5. The method of claim 1, further comprising stopping the first timer in response to selection of a suitable cell or selection of a cell using another radio access technology (RAT).

6. The method of claim 1, further comprising:
determining whether the selected cell is associated with conditional handover configuration or not;
if the selected cell is associated with the conditional handover configuration, performing a conditional handover (CHO) procedure and accessing the selected cell; and
if the selected cell is not associated with the conditional handover configuration, performing a re-establishment procedure and accessing the selected cell.

7. The method of claim 6, further comprising:
in response to successful access to the selected cell associated with the conditional handover configuration, transmitting a RRC reconfiguration complete message and releasing CHO configuration information associated with all CHO candidate cells.

8. The method of claim 6, further comprising:
in response to successful access to the selected cell associated with the conditional handover configuration, starting a second timer upon a RRC reconfiguration complete message transmission; and
in response to expiry of the second timer, releasing CHO configuration information associated with all CHO candidate cells.

9. The method of claim 8, wherein the second timer is configured by a source base station (BS), and configuration information of the second timer is transmitted from the source BS to the UE.

10. The method of claim 9, wherein the configuration information of the second timer is included in a CHO command transmitted from the source BS to the UE.

11. The method of claim 8, wherein the second timer is configured by a target BS, and configuration information of the second timer is transmitted from a source base station (BS) to the UE.

12. The method of claim 11, wherein the configuration information of the second timer is included in a handover acknowledge message, and wherein the handover acknowledge message is transmitted from the target BS to the source BS and is then transmitted from the source BS to the UE.

13. An apparatus comprising a source base station (BS), the apparatus further comprising:
at least one memory; and
at least one processor coupled with the at least one memory and configured to cause the source BS to:
determine whether a conditional handover (CHO) procedure of a user equipment (UE) to a target cell is completed; and
in response to completion of the CHO procedure, transmit a handover cancel message to a candidate BS which the UE does not access, the candidate BS being separate from the target cell;
wherein the handover cancel message includes an information element to indicate a cause as to why a handover procedure to the candidate BS is cancelled.

14. The source BS of claim 13, wherein the cause includes at least one of CHO completion and procedure cancellation.

15. The source BS of claim 14, wherein, in response to the cause including the procedure cancellation and the UE in the CHO procedure being not associated with dual connectivity (DC), the cause represents that the UE has completed the CHO procedure and the candidate BS can cancel CHO configuration information associated with the UE.

16. The source BS of claim 13, wherein a handover acknowledge message is transmitted from the candidate BS to the source BS.

17. The source BS of claim 13, wherein CHO configuration information is cancelled from the candidate BS in response to receipt of the handover cancel message.

18. The source BS of claim 13, wherein the at least one processor causing the source BS to determin e whether the CHO procedure of the UE to the target cell is completed further comprises causing the source BS to:
receive a handover complete message from a target BS; and
in response to receipt of the handover complete message, determine that the UE successfully accesses the target cell.

19. A user equipment (UE), comprising:
at least one memory; and
at least one processor coupled with the at least one memory and configured to cause the UE to:
initiate a re-establishment procedure and start a first timer for controlling a cell selection procedure, based on at least one of the following conditions:
detecting a re-configuration with sync failure;
detecting mobility from new radio (NR) failure;
expiry of a handover failure timer;
detecting an indication of an integrity check failure from lower layers concerning signaling radio bearer (SRB) 1 or SRB2, except the integrity check failure being detected on a radio resource control (RRC) re-establishment message;
detecting a RRC connection reconfiguration failure;
expiry of a conditional handover failure timer; and
initiating the cell selection procedure; and
perform the cell selection procedure to select a cell.

20. The UE of claim 19, wherein the first timer is started based further on at least one of the following conditions:
detecting a radio link failure; and
expiry of a radio link failure timer.

* * * * *